Figure 1:
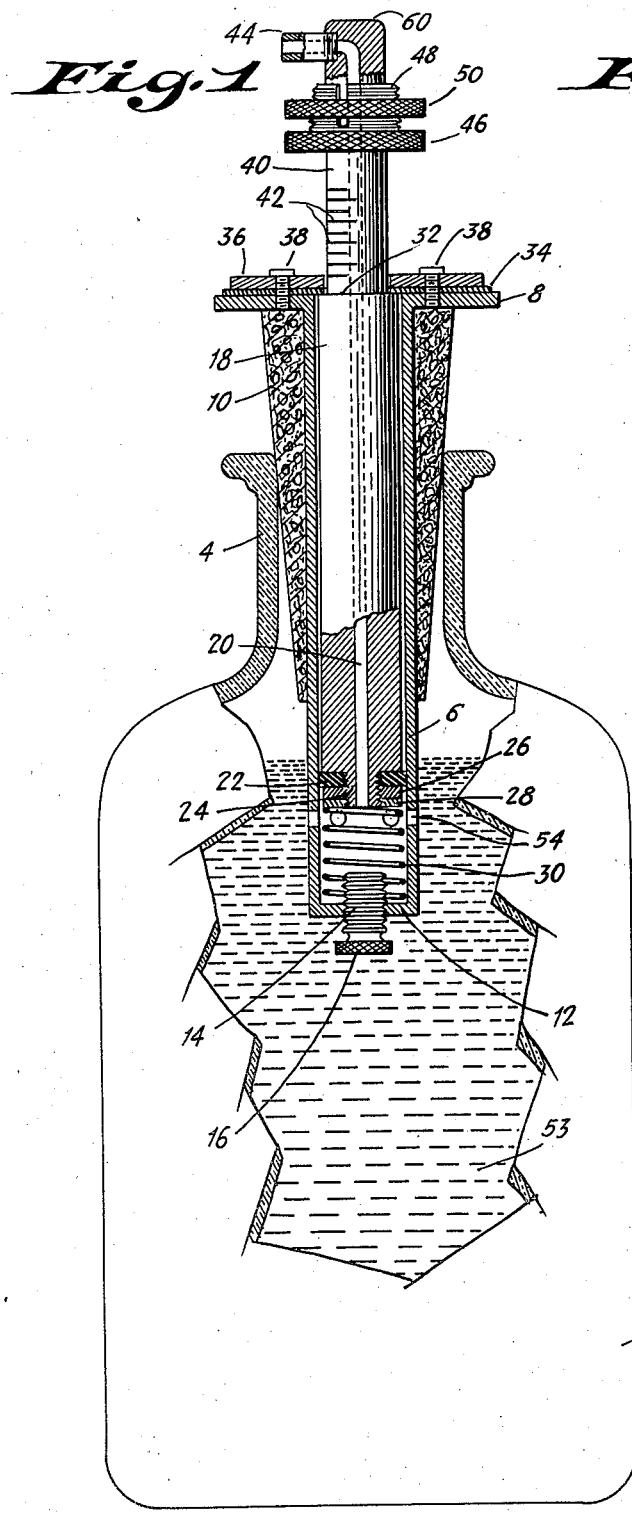

July 12, 1938.   N. A. LEWIS   2,123,737

FLUID DISPENSING APPARATUS

Filed March 31, 1937   5 Sheets-Sheet 1

INVENTOR
NEWTON A. LEWIS
BY Harry Tunick
ATTORNEY

July 12, 1938.    N. A. LEWIS    2,123,737
FLUID DISPENSING APPARATUS
Filed March 31, 1937    5 Sheets-Sheet 2

INVENTOR
NEWTON A. LEWIS
BY
ATTORNEY

July 12, 1938.   N. A. LEWIS   2,123,737
FLUID DISPENSING APPARATUS
Filed March 31, 1937   5 Sheets-Sheet 3

INVENTOR
NEWTON A. LEWIS
BY
ATTORNEY

July 12, 1938. N. A. LEWIS 2,123,737
FLUID DISPENSING APPARATUS
Filed March 31, 1937 5 Sheets-Sheet 4
Fig. 7 Fig. 7a Fig. 7d
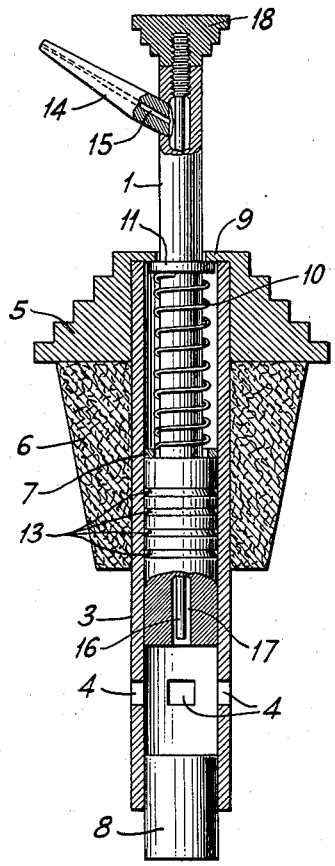
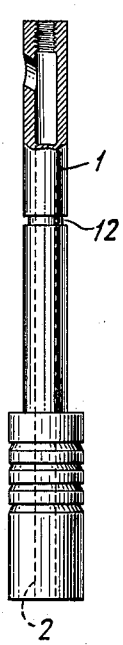
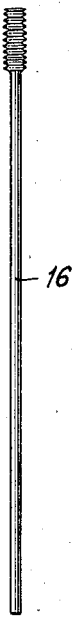
Fig. 7c
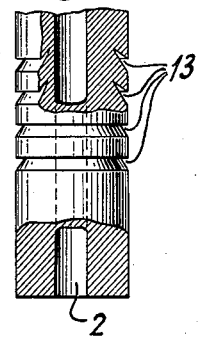
Fig. 7b
INVENTOR
NEWTON A. LEWIS
BY *Tony Tunick*
ATTORNEY

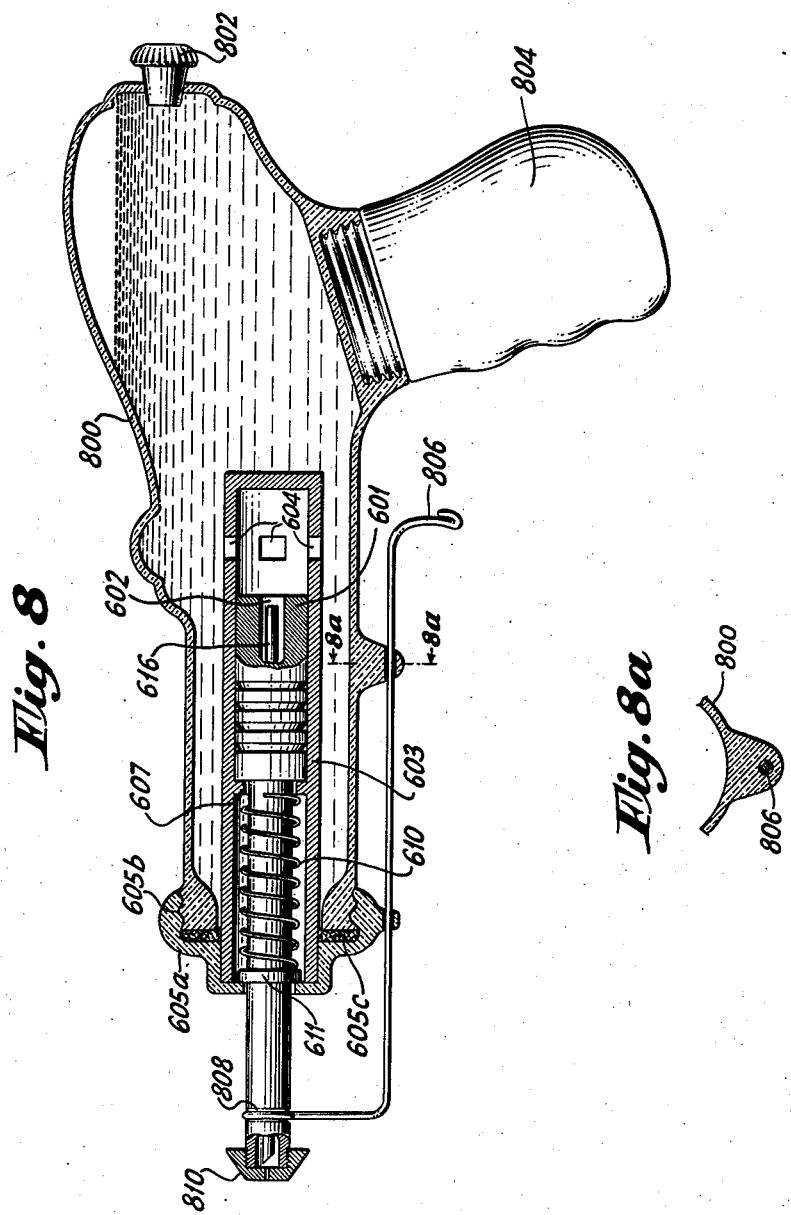

Patented July 12, 1938

2,123,737

UNITED STATES PATENT OFFICE 2,123,737

FLUID DISPENSING APPARATUS

Newton A. Lewis, Bronx, N. Y.

Application March 31, 1937, Serial No. 134,022

10 Claims. (Cl. 221—147)

This application is a continuation in part of my copending application Serial No. 731,253, filed June 19, 1934.

My present invention relates to fluid dispensing apparatus and has for one of its objects the provision of an improved fluid dispensing device adapted in general for all fluid containers and in particular for bottles. A further object of my present invention is to provide apparatus simple in construction, efficient and reliable in operation, and relatively inexpensive, for accurately dispensing desired quantities of liquids, such as liquors, medicines, oils, acids, etc.

Further objects of my present invention are to provide dispensing apparatus in combination with readily accessible means for accurately varying at will the output of the apparatus; to provide a device which is relatively sanitary in use and easily cleaned; and to provide dispensing apparatus which automatically acts to prevent drippage after known, desired quantities of liquids are expelled.

Briefly, in effecting the foregoing objects, I removably arrange a cylinder within, say, the neck of a bottle. I also provide a piston, having an interiorly disposed passage within the cylinder which has its bottom end walled off. By having a number of inlet ports near the bottom of the cylinder, liquid enters the space between the bottom cylinder wall and the piston. Pressure upon the piston closes off the ports and forces the liquid up the passageway within the piston and out through an outlet orifice provided at the top of the piston. Springs and/or stops and/or a volume controlling plug and/or a scale are provided to cause initial setting and accurate expulsion of desired predetermined quantities of fluid, care being taken to dimension the apparatus, ports, etc., so as to render them suitable for the service intended. Thus, smaller ports need be provided for measuring out alcohol as compared to dispensing of heavy oil or syrup. It is to be noted that my apparatus is so devised that after a quantity of liquid is expelled, a partial vacuum is created in the piston passageway, as a consequence of which drippage is prevented—a very desirable feature.

In a preferred form of my invention, I employ a "resistance rod" in the piston passageway. In this way, the fluid to be ejected is caused to travel through an annular, cylindrical space within the piston for the purposes and results to be explained more fully hereinafter.

Figure 2:
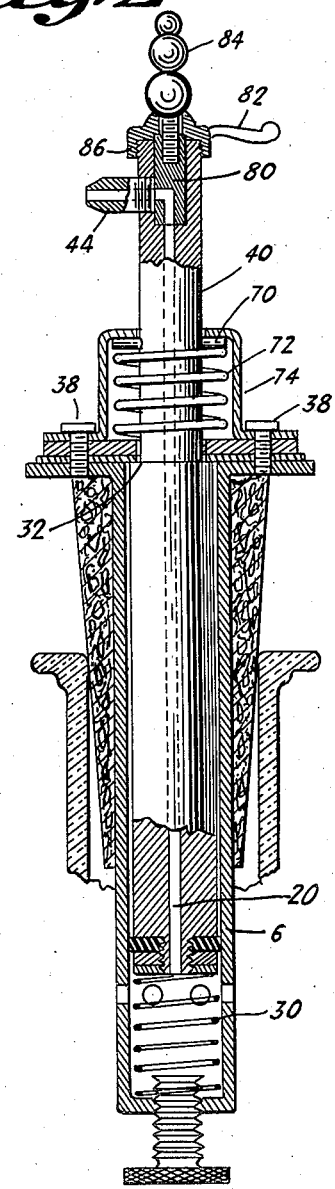
Figure 3:
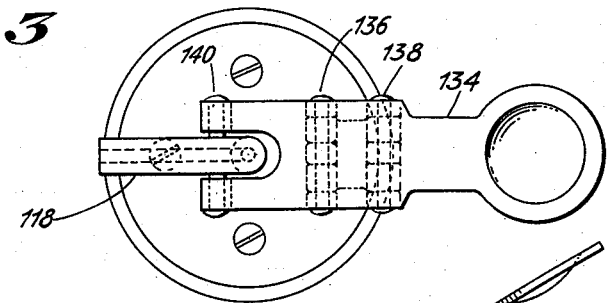
Figure 4:
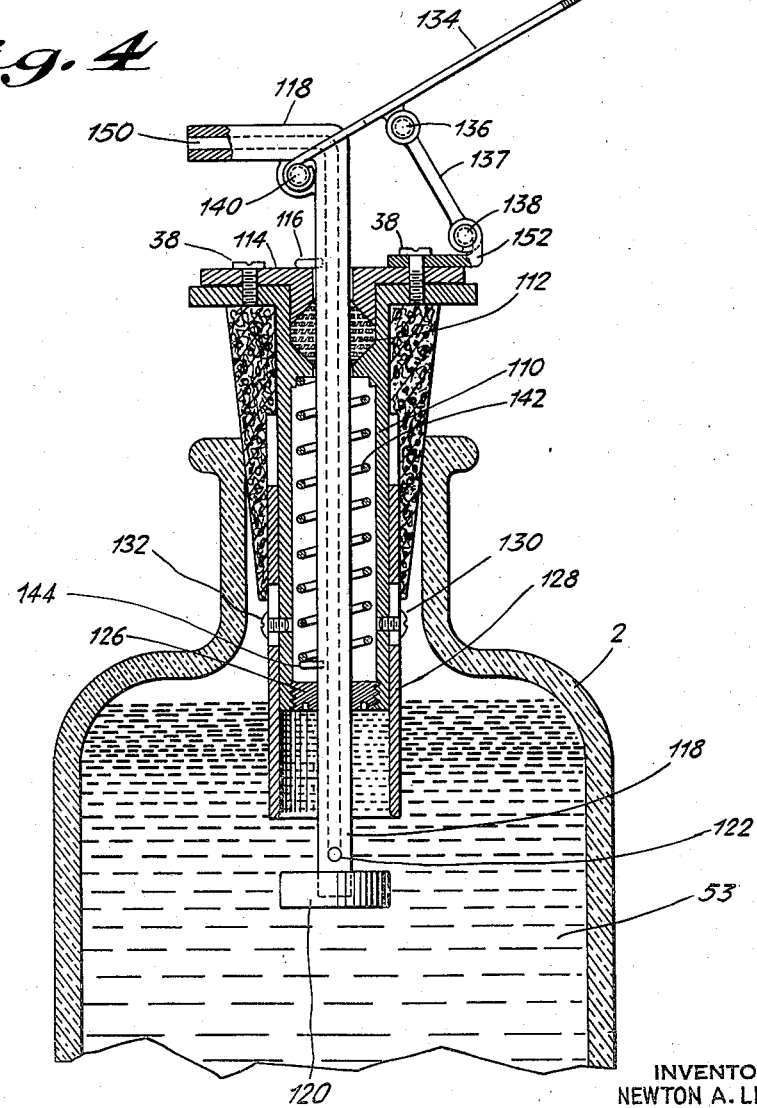
Figure 5:
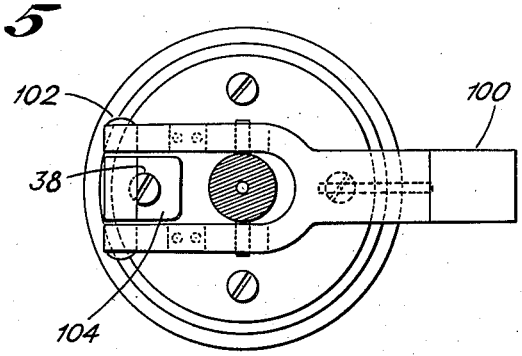
Figure 6:
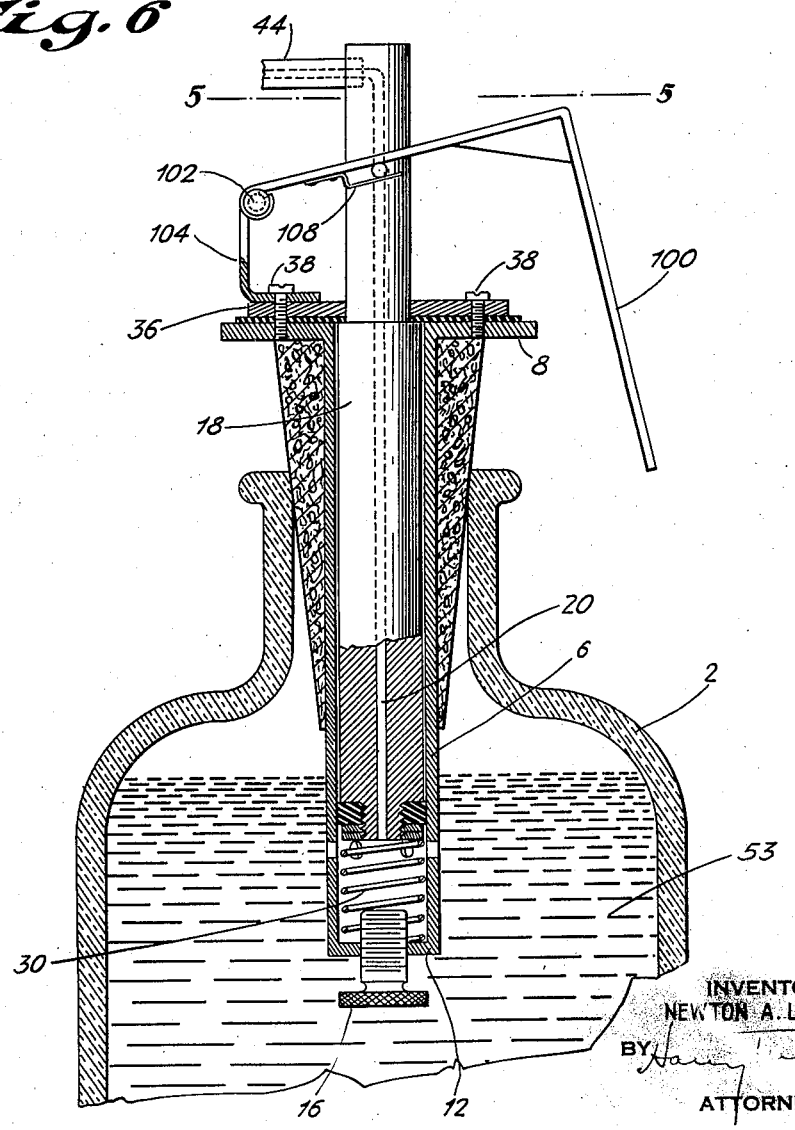

As required by law, my invention is claimed in the appended claims. However, it may best be understood both as to its structural organization and mode of operation by referring to the accompanying drawings, wherein Figure 1 illustrates a preferred modification of my fluid dispenser; Figure 2 is a modified embodiment thereof; Figure 3 is a top plan view of Figure 4; Figure 4 is a modification of Figure 1 employing a lever actuating arrangement; Figures 5 and 6 are similar views of another modification; Figure 7 is a view partly in cross-section of the preferred form of my invention employing the "resistance rod"; Figures 7a, 7b, 7c and 7d show details of Figure 7; and Figure 8 shows my preferred form of invention as applied to a liquid pistol repeater.

Turning to the drawings and in particular to Figure 1, I have illustrated, partly in cross-section and partly broken away, a fluid or liquid container 2, having a neck or neck-like portion 4. As shown, my improved liquid dispenser comprises a cylinder 6 having either integral therewith or otherwise fastened thereto, a flange 8. Flange 8 limits the movement of the cylinder 6 within the neck 4 and, hence, the container 2, and the tapered frictional element 10, preferably of cork, rubber or any other suitable material, frictionally and removably fixes the cylinder 6 within the container 2. Obviously, the element 10 is made cylindrical on its interior surface and conical shaped on its exterior surface. The bottom of the cylinder 6 is closed off by the closing off portion or member 12, which may be made integral with the cylinder, and into the bottom wall 12 there is screwed a volume controlling plug having a screw threaded solid cylindrical portion 14 and a knurled volume vernier adjusting knob 16.

Within the cylinder there is disposed a piston 18 having an interiorly disposed, preferably circular in cross-section, passageway or opening 20 extending along the longitudinal dimension of the piston. To the bottom of the piston, in any suitable way, there is fastened a rubber or leather washer 22 by means of the screw threaded projection 24 and locking nuts 26, 28. The piston is resiliently urged upwardly by means of the spring 30 so that the shoulder or abutment or stop-like portion 32 of the piston abuts against gasket 34 held in place by means of the piston retaining collar or ring 36. As shown in the drawing, the retaining ring 36 is removably fixed into place by means of bolts 38.

On the portion of the piston of smaller diameter, which portion is labeled 40, there may be etched or otherwise cut into the recessed portion 40, gage markings 42, for a purpose which shall be explained more fully hereinafter. The fluid passageway 20 communicates with the exterior of the container 22 by means of the outlet orifice or port 44 consisting of a drilled cylindrical pipe or perforated rod screwed into a suitable screw threaded opening in the upper end of the piston 49. Also about the recessed portion 40 of the piston there is placed a sleeve clamp 46 having conical shaped screw threaded fingers 48 urged against the recessed portion 40 by means of a knurled knob or nut 50.

In operation, the fluid 53 flows through the inlet ports 54 in the bottom of the cylinder 6, filling up the space between the lower portion of the piston and the bottom wall 12 of cylinder 6. Finger pressure applied to the top 60 of the piston structure will cause the leather washer and the piston structure to move past the inlet ports 54, thereby entrapping fluid in the bottom portion of the cylinder 6. Increased pressure will cause the fluid to rise through the interiorly disposed passage 20 and out through the outlet pipe 44. By moving the clamping ring along the recessed portion 40 and locking it into place by means of the lock nut 50, the movement of the piston 18 may be limited so as to cause ejection of predetermined quantities of the fluid 53. In addition, for this purpose, there may be provided the plug 14 serving as a vernier volume controlling adjustment.

It should be clear that the dimensions of the apparatus shown in Figure 1 may be made such as to fit solely within the neck of a bottle and this, incidentally, is the preferred dimension, that being given on the drawing being enlarged so as to make the various parts stand out and be more readily understood. With the preferred dimensioning, the bottle or container may be tilted on its side to hasten filling of the space below the inlet ports 54, and as, in the case of drinking fluids, such as Angostura Bitters, the preliminary movement of the bottle on its side is a natural and already adopted movement of the bottle. Hence, no action in deriving fluid from the bottle is wasted.

In the apparatus shown in Figure 2, the arrangement is quite similar to that shown in Figure 1 and, hence, apparatus correspondingly labeled will not be referred to in detail. However, in the system shown in Figure 2, the recessed portion 40 of the piston is provided with an additional stop 70 against which spring 72 presses, assisting spring 30 in urging the piston structure upwardly. Although shown in Figure 2, the abutment 32 is unnecessary and the entire piston may be made of uniform diameter, if found desirable. The housing or cap 74, in this event, held into place against the cylinder 6 by means of bolts 38, will limit the upward movement of the piston structure.

Also in Figure 2, a stop-cock 80 is provided which may be rotated by means of handle 82, member 84 screwed into the stop-cock serving merely for decorative purposes. The handle 82 may be provided with threads 86 of such length that when handle 82 is moved to its extreme thread closing position, the stop-cock will close off the outlet port 44, thus preventing evaporation of volatile liquids. To indicate when there is communication between the passage 20 and the opening in the outlet port 44, matters should be arranged such that the handle 82 lies in a plane parallel to the port 44, and, similarly, if desired, when 82 is at right angles to the port 44, the cock 80 will serve to close off communication with the interior of the container 2.

In the apparatus illustrated in Figures 3 and 4, the cylinder 110 is provided with a packing space or gland into which is put suitable packing material 112, pressed into place by member 114 and cooperating screws 38. The piston rod 118 is urged downwardly by spring 142 working against the upper wall of cylinder 110 and piston rod pin 144. The lower end of cylinder 110 is closed off by the wall or plug 126 through which rides piston rod 118. The piston rod is hollowed so as to have a centrally disposed passageway 150 which communicates with the outside by port 122. When the piston rod 118 is moved upwardly, head 120 entraps a portion of the fluid 53 between it and wall 126 so that continued movement of the head 120 upwardly forces the entrapped liquid through hole 122 and out through the passageway 150.

To adjust the amount of fluid ejectable, the sleeve or port cut off cylinder 128 is adjustably fixable along cylinder 110 by means of screws 130, 132. Lower extreme movement of the piston rod 118 is determined by a pin or stop 116 although fulcrum 140 may be used for this purpose.

Upward movement of the piston rod 118 is accomplished by lever 134, pivotally mounted to 118 at 140 and very loosely mounted pivotally at 136 to rod 137, in turn fulcrumed to the angle piece or support 152.

Figures 5 and 6 illustrate a modification of Figure 1, in which a bell crank or bent lever 100 is provided. Lever 100 is fulcrumed at 102 upon support 104 in the form of an angle iron. The angle piece or support 104 is fixedly mounted to the cylinder by screw 38. Obviously, by pressing lever 100 towards the neck of the bottle, movement of the piston will follow with accompanying ejection of fluid from the container 2 through orifice 44. Flat spring 108, fastened as shown, may be provided to keep lever 100 in correct operating position.

Referring to Fig. 7, Fig. 7a, Fig. 7b, Fig. 7c and Fig. 7d, piston 1 is provided with a bore or hole 2 throughout its length. The piston slidably engages cylinder 3 having ports 4 near one end. Cylinder 3 is fixed in any suitable way to decorative collar 5 to which is fastened the friction annulus 6. Annulus 6 frictionally engages the neck of a bottle such as neck 4 of bottle 2 (Fig. 1). If desired, the bottle may be screw threaded and collar 5 provided with an engaging screw threaded piece (not shown) rather than the cork annulus 6. A shoulder or stop 7 is pressed or otherwise securely fixed to the interior of cylinder 3. The volume adjustment plug 8 of Figure 7 is frictionally pressed any desired amount into the bottom of the cylinder 3, thereby adjusting the system to eject, with each piston movement, the volume desired or required.

Collar 5 is provided with a shoulder 9 which serves to limit the upward thrust of the piston 1 when so urged by spring 10 which rests upon stop 7 and presses against retainer 11. Retaining piece 11 may be built integrally with the piston, but preferably is made U-shaped as shown in Figure 7b and slipped into slot 12 (see Figure 7a) cut into the piston.

The base or larger diametered plunger portion 70 of the piston is provided with a series of grooves 13 (see Figure 7c) so cut as to serve as a liquid seal. The piston is provided with a nozzle 14 having a small hole or bore 15.

Resistance rod 16 is preferably upset at one end and provided with threads engaging the female threads at the upper end of the piston bore. The resistance rod is locked into place by the action of the internally threaded thumb piece 18 which is screwed over the end of the rod and tightened down against the end of the piston.

The resistance rod is slightly smaller than the piston bore or hole 2 so that there is a cylindrical annular passageway from the space beneath the piston to bore 15 of nozzle 14. The clearance between the resistance rod and piston bore should vary with the viscosity and specific gravity of the liquids used. As an example, the difference in radii of resistance rod and piston bore may be about 0.0025 inch for water, light oils and alcohol.

I have found the resistance rod to be advantageous since, among other things, it provides for quick cut-off, after ejection, and reduces leakage when the device is upset.

Any of the devices hereinabove described may be attached to a machine and operated by cam and/or lever arrangements to cause timed spraying or squirting of oil on moving machine parts which may not be oiled, practically, by conventional methods.

My invention may be incorporated in a "repeating" type of water pistol by placing the nozzle where the piece 18 of Figure 7 now is by suitably designing the other parts, such as by adding a trigger action or lever system for the piston. Such an arrangement is shown by way of example in Figure 8.

Thus, turning specifically to Figure 8, a glass or plastic shell or liquid container 800 is provided with a friction or screw threaded refill cap 802 and a suitable grip stock 804. The ejecting mechanism, as before, includes a cylinder 603 provided with ports 604 and a stop 607. Piston 601 is urged to the left by spring 610 pressing against retainer piece 611 and resting against stop 607.

The cylinder 603 is fixed to the screw threaded end piece 605a engaging threads 605b on the left end of container 800. To prevent leakage a gasket 605c is provided.

The trigger consists of a suitably mounted and bent rod 806 engaging the external groove 808 on the exterior of the piston which is also provided with a nozzle 810.

The resistance rod tends to float or nearly floats on the liquid in the piston passage 602. The extreme lefthand end of the rod 602 is beveled, as shown; that is, cut off at an angle, to prevent closing of the nozzle outlet.

The "repeater" of Figure 8 closely simulates a real gun since the floating resistance rod produces a metallic "click" with each movement of the trigger. That is, the rod moves back and forth in the piston bore and clicks against the nozzle head when the trigger is pulled and may also click against the bottom of the pump well when the trigger is suddenly released.

Having thus described my invention, what I claim is:

1. Dispensing apparatus for a fluid container comprising a cylinder, means for removably fixing said cylinder to the top of a fluid container, means closing off the bottom end of said cylinder, a piston within said cylinder, said piston having an interiorly disposed fluid passage, said cylinder having a plurality of fluid inlet ports near its closed off bottom whereby fluid is permitted to flow from said fluid container through said ports and into the space between the bottom of said cylinder and the bottom of said piston, stop means, resilient means resiliently holding said piston against said stop means, said pistons being adapted to move against said resilient means and past said ports whereby the fluid entrapped in the bottom of said cylinder is caused to move through said interiorly disposed passage, and means for predetermining the amount of fluid which is permitted to flow from said fluid container into the space between the bottom of said cylinder and the bottom of said piston.

2. Dispensing apparatus for a fluid container comprising a cylinder, means for removably fixing said cylinder to the top of a fluid container, means closing off the bottom end of said cylinder, a piston within said cylinder, said piston having an interiorly disposed fluid passage, a resistance rod mounted within said passage, said cylinder having a plurality of fluid inlet ports near its closed off bottom whereby fluid is permitted to flow from said fluid container through said ports and into the space between the bottom of said cylinder and the bottom of said piston, stop means, resilient means resiliently holding said piston against said stop means, said piston being adapted to move against said resilient means and past said ports whereby the fluid entrapped in the bottom of said cylinder is caused to move through said interiorly disposed passage, and means for predetermining the amount of fluid which is permitted to flow from said fluid container into the space between the bottom of said cylinder and the bottom of said piston.

3. Dispensing apparatus comprising a cylinder, means for frictionally and removably fixing said cylinder to the top of a fluid container, means closing off the bottom end of said cylinder, a piston within said cylinder, said piston having an interiorly disposed fluid passage, said cylinder having a plurality of fluid inlet ports near its closed off bottom whereby fluid is permitted to flow from said fluid container through said ports and into the space within said cylinder and below said piston, stop means mounted upon said cylinder, resilient means resiliently holding said piston against said stop means, said piston being movable against said resilient means and past said ports whereby the entrapped fluid is caused to move through said interiorly disposed passage, and means for predetermining the amount of fluid which is permitted to flow from said fluid container into the space between the bottom of said cylinder and the bottom of said piston.

4. Dispensing apparatus comprising a cylinder, means for frictionally and removably fixing said cylinder to the top of a fluid container, means closing off the bottom end of said cylinder, a piston within said cylinder, said piston having an interiorly disposed fluid passage, a resistance rod mounted within said passage, said cylinder having a plurality of fluid inlet ports near its closed off bottom whereby fluid is permitted to flow from said fluid container through said ports and into the space within said cylinder and below said piston, stop means mounted upon said cylinder, resilient means resiliently holding said piston against said stop means, said piston being movable against said resilient means and past said ports whereby the entrapped fluid is caused to move through said interiorly disposed passage, and means for predetermining the amount of fluid which is permitted to flow from said fluid container into the space between the bottom of said cylinder and the bottom of said piston.

5. Dispensing apparatus for a fluid container comprising a cylinder, means for removably fixing said cylinder to the top of a fluid container, a wall closing off the bottom end of said cylinder, a piston within said cylinder, said piston having an interiorly disposed fluid passage, said cylinder having a plurality of fluid inlet ports near its bottom wall whereby fluid is permitted to flow from said fluid container through said ports and into the space between the bottom wall of said cylinder and said piston, a stop, a spring urging said piston against said stop, and a piston rod for causing motion of said piston against said spring and past said ports whereby the fluid entrapped below said piston is caused to move through said interiorly disposed passage.

6. Dispensing apparatus for a fluid container comprising a cylinder, means for removably fixing said cylinder to the top of a fluid container, a wall closing off the bottom end of said cylinder, a piston within said cylinder, said piston having an interiorly disposed fluid passage, a resistance rod mounted within said passage, said cylinder having a plurality of fluid inlet ports near its bottom wall whereby fluid is permitted to flow from said fluid container through said ports and into the space between the bottom wall of said cylinder and said piston, a stop, a spring urging said piston against said stop, and a piston rod for causing motion of said piston against said spring and past said ports whereby the fluid entrapped below said piston is caused to move through said interiorly disposed passage.

7. Dispensing apparatus comprising a cylinder, a wall closing off the bottom end of said cylinder, a piston within said cylinder, said piston having an interiorly disposed fluid passage, a resistance rod lying within said passage, said cylinder having a plurality of fluid inlet ports near its bottom wall whereby fluid is permitted to flow from a fluid container through said ports and into the space within said cylinder and piston, a stop, a spring yieldably holding said piston against said stop, and means for causing motion of said piston against said spring and past said ports whereby fluid entrapped below said piston is caused to move through said interiorly disposed passage.

8. Dispensing apparatus comprising a cylinder, a wall closing off the bottom end of said cylinder, a piston within said cylinder, said piston having an interiorly disposed fluid passage, a resistance rod lying within said passage, said cylinder having a plurality of fluid inlet ports near its closed off bottom whereby fluid is permitted to flow from a fluid container through said ports and into the space within said cylinder and piston, stop means for limiting the travel of said piston along said cylinder, resilient means resiliently holding said piston against said stop means, and means for causing motion of said piston against said resilient means and past said ports whereby fluid entrapped below said piston is caused to move through said interiorly disposed passage.

9. A fluid dispensing system comprising a container having a neck, a cylinder, a tapered cylindrical cork-like frictional element about said cylinder and maintaining said cylinder in removable frictional engagement with said neck, a flange fixed to said cylinder for limiting the movement of said cylinder and its surrounding frictional element into said neck, a cylindrical piston within said cylinder, said piston being recessed at its upper portion so as to have a shoulder, a retaining ring fixed to said flange and having an internal diameter smaller than the larger diameter of said piston, means for closing off the bottom of said cylinder, means within said cylinder resiliently pressing said piston shoulder against said retaining ring, a vernier volume controlling plug protruding through and adjustable with respect to said bottom closing off means for said cylinder, a plurality of inlet ports arranged completely around said cylinder whereby to enable fluid from said container to flow in the space between the bottom of said piston and the bottom of said cylinder, said piston having an interiorly disposed passage, an outlet orifice associated with said passage and located at the top of the recessed portion of said piston, a stop fixed to said recessed piston portion, a spring about said recessed piston portion cooperating with said stop for urging said piston upwardly against said retaining ring, and a housing fixed to said flange and surrounding said last mentioned stop and spring, the entire arrangement operating in a fashion such that when said piston is moved towards the bottom of said cylinder fluid entrapped within the bottom of said cylinder rises within said interiorly disposed passage and out through said outlet orifice.

10. A fluid dispensing system comprising a container having a neck, a cylinder, a tapered cylindrical frictional element about said cylinder and maintaining said cylinder in removable frictional engagement with said neck, a flange fixed to said cylinder for limiting the movement of said cylinder and its surrounding frictional element into said neck, a cylindrical piston within said cylinder, said piston being recessed at its upper portion so as to have a shoulder, a retaining ring fixed to said flange and having an internal diameter smaller than the larger diameter of said piston, means for closing off the bottom of said cylinder, a plurality of inlet ports arranged completely around said cylinder whereby to enable fluid from a container to flow in the space between the bottom of said piston and the bottom of said cylinder, said piston having an interiorly disposed passage, an outlet orifice associated with said passage and located at the top of the recessed portion of said piston, a stop fixed to said recessed piston portion, a spring about said recessed piston portion cooperating with said stop for urging said piston upwardly, and a housing fixed to said flange and surrounding said last mentioned stop and spring, the entire arrangement operating in a fashion such that when said piston is thrust towards the bottom of said cylinder fluid entrapped within the bottom of said cylinder rises within said interiorly disposed passage and out through said outlet orifice.

NEWTON A. LEWIS.